3,348,961
PROCESS FOR THE FABRICATION OF
IMPROVED FLUORESCENT LAMPS
Richard C. Ropp, Towanda, Pa., and Robert F. Quirk, Danvers, Mass., assignors to Sylvania Electric Products Inc., a corporation of Delaware
No Drawing. Filed Jan. 2, 1963, Ser. No. 248,852
1 Claim. (Cl. 117—33.5)

This invention relates to fluorescent lamps and more particularly to a method of improving the brightness and maintaining a high L.P.W. output throughout their life. Specifically this invention concerns the attainment of such improvements in fluorescent lamps containing zinc silicate phosphors activated by manganese. More specifically, this invention relates to an improved method of fabricating a fluorescent lamp containing manganese activated zinc silicate or zinc orthosilicate phosphors having a willemite crystal structure.

Many methods have been devised for increasing brightness and improving L.P.W. maintenance over the life of fluorescent lamps. But according to our invention, we have discovered that when certain process steps are followed in fabrication of fluorescent lamps containing a zinc silicate phosphor, that substantial improvement can be attained. These steps involve a thermal treatment of the phosphor, after it has been fully prepared, together with an addition of a small and critical quantity of antimony oxide to the coating suspension or to the treated phosphor. It is the combination of these steps which produces the lamp improvement of our invention and not either of the steps individually. The result was unexpected because neither the thermal treatment of the phosphor prior to its incorporation into a lamp nor the addition of antimony oxide alone to the process produces the improved lamp of our invention.

Zinc silicate phosphors activated by manganese are materials which have been the subject of extensive research investigation. The green luminescent form is a bright phosphor, but exhibits poor maintenance in lamps. In the United States patent of Roy et al., No. 2,607,014 issued August 12, 1952 disclosure is made that lumen maintenance and brightness during life of fluorescent lamps may be increased by providing the inner wall of a lamp envelope with a surface containing antimony before the fluorescent material is applied thereto, or as an alternative the antimony could be added to the phosphor forming raw materials or the finished phosphor before forming the suspension. Now although this procedure does have advantages such as indicated by the patent, such improvements are not as great as can be obtained when the finished phosphor is thermally treated according to our invention and the lamps are then processed with antimony oxides.

We have discovered that processing of a zinc silicate phosphor should involve a thermal treatment which is a reheating of the phosphor together with adding about 0.4% $Sb_2O_3$ to the coating suspension. These steps produce a lamp which is superior to lamps containing thermally treated phosphor only or those containing the untreated phosphor, but processed with antimony in the coating suspension.

According to the conventional synthesis of the phosphor, temperatures above 2300° F. and a prolonged sintering time are necessary to produce a reaction between the zinc oxide, manganese carbonate and silicon dioxide which are the raw material components utilized to form the zinc silicate phosphor activated by manganese. A slow cooling from this high temperature is generally necessary after the phosphor has been prepared.

According to our invention, we reheat the prepared phosphor according to a programmed thermal treatment in which the maximum temperature is critical. We prefer to reheat the phosphor in a cold furnace to a temperature which lies between 1850 and 2400° F., the best results being obtained when the temperature during thermal treatment is maintained about 1900 to 1950° F. for a period of two to three hours. After heating, the furnace is allowed to cool to room temperature gradually over a period of 24 to 36 hours. Although a more rapid reduction in temperature can be used, the phosphor thereby produced has a somewhat poorer maintenance. In Table I following, the effect of the thermal treatment is shown upon lamp quality. When the phosphor was slowly cooled from 1900–1950° F. to room temperature and when antimony was added to the coating media, the maintenance of the lamp was quite good; within 500 hours the percent maintenance has dropped only 12.6% whereas when a thermal treatment is not used (control) and antimony is added to the phosphor, the initial brightness is low and the maintenance has dropped 14.3 percent. Although higher temperatures can be used for the thermal treatment, as high as 2400° F., the maintenance and the initial brightness are reduced slightly.

TABLE I

| Thermal Treatment | $Sb_2O_3$, Percent | Lumens | | | Percent M[1] |
|---|---|---|---|---|---|
| | | 0 Hr. | 100 Hr. | 500 Hr. | |
| Quenched from 1,950° F | None | 4,706 | 4,109 | 3,756 | 79.6 |
| Do | 0.4 | 4,842 | 4,439 | 4,228 | 87.4 |
| Quenched from 2,400° F | None | 4,605 | 3,998 | 3,652 | 78.8 |
| Do | 0.4 | 4,699 | 4,187 | 3,948 | 84.0 |
| Control—no heat treatment | None | 4,596 | 3,931 | 3,496 | 76.2 |
| Do | 0.4 | 4,725 | 4,319 | 4,048 | 85.7 |

[1] Percent maintenance.

As is apparent from the foregoing table, the reheating step is quite important. But only the combination of reheating together with the antimony addition gives a superior lamp. As will be seen from Table II, the cooling rate is also quite important. When the phosphor is heated to 2400° F., the brightness is increased in each and every stage of life and maintenance is increased by prolonging the cooling time. When the phosphor is quenched rapidly, the initial brightness is lower than a phosphor which has been cooled very slowly; also the percent maintenance is reduced since the brightness tends to decrease rather rapidly.

TABLE II

| Cooling Rate From 2,400° F. | $Sb_2O_3$, Percent | Lumens | | | Percent M[1] |
|---|---|---|---|---|---|
| | | 0 Hr. | 100 Hr. | 500 Hr. | |
| Quenched | None | 4,605 | 3,998 | 3,652 | 78.8 |
| Do | 0.4 | 4,699 | 4,187 | 3,948 | 84.0 |
| Normal | None | 4,659 | 4,015 | 3,712 | 77.6 |
| Do | 0.4 | 4,793 | 4,263 | 4,161 | 86.7 |
| Very slowly cooled | None | 4,706 | 4,320 | 4,063 | 86.3 |
| Do | 0.4 | 4,798 | 4,410 | 4,240 | 88.3 |

[1] Percent maintenance.

This data may be explained by considering that the slower the cooling rate, the longer the reheated phosphor remains in the critical temperature range. And hence, a prolonged thermal treatment within the critical temperature range will improve the phosphor further. As indicated by Table III it will become apparent that when slow cooling from 1950° F. is used, the brightness is increased over life when compared to lamps having the same phosphor but which is quenched quickly. It is to be noted also that the effectiveness of thermal treatment is not realized when antimony is not included in the lamp fabricating steps.

TABLE III

| Heat Treatment | Sb₂O₃, Percent | Lumens | | | Percent M [1] |
| --- | --- | --- | --- | --- | --- |
| | | 0 Hr. | 100 Hr. | 500 Hr. | |
| Programmed—slowly cooled | None | 4,764 | 4,260 | 3,854 | 80.9 |
| Do | 0.4 | 4,832 | 4,560 | 4,336 | 89.7 |
| Programmed—quenched | None | 4,520 | 3,607 | 3,409 | 75.9 |
| Do | 0.4 | 4,552 | 4,196 | 4,054 | 89.0 |

[1] Percent Maintenance.

Referring now to addition of antimony, we have discovered that the $Sb_2O_3$ cannot be added to the phosphor prior to the thermal treatment. Comparing Table III and Table IV, when the slowly cooled-antimony containing lamp is operated (Table III) the initial brightness is 4832 lumens which diminishes to 4336 lumens after 500 hours for a maintenance of 89.7% whereas when antimony is added to the phosphor before the heat treatment (Table IV) the initial brightness is 4584 lumens which diminishes to 4019 lumens after 500 hours for a maintenance of 87.7%. Hence the addition of antimony before thermal treatment is not advantageous. When the phosphor is not heat treated at all but merely mixed with the antimony, the initial brightness is improved but it diminishes rather rapidly for a percent maintenance of only 81.6%.

TABLE IV

[0.1% $Sb_2O_3$ added before heat treatment]

| Cooling | Lumens | | | Percent M |
| --- | --- | --- | --- | --- |
| | 0 Hr. | 100 Hr. | 500 Hr. | |
| Normal (slowly cooled) | 4,584 | 4,284 | 4,019 | 87.7 |
| Quenched | 4,592 | 4,263 | 3,972 | 86.5 |
| No treatment | 4,721 | 4,264 | 3,845 | 81.6 |

In addition to the fact that the antimony must be added only after the heat treatment, we have found that the amounts which are added to the coating suspension are also quite critical and should be maintained within the range of 0.2 to 0.7% by weight of the phosphor in the coating suspension as will be seen from Table V. Below 0.2 the brightness at each and every stage of life is reduced and above 0.7 the percent maintenance tends to drop.

TABLE V

[$Sb_2O_3$ added to phosphor as weight percent of phosphor]

| | Lumens | | | Percent M |
| --- | --- | --- | --- | --- |
| | 0 Hr. | 100 Hr. | 500 Hr. | |
| 0 | 4,284 | 3,801 | 3,590 | 83.9 |
| 0.2 | 4,502 | 4,184 | 4,114 | 91.2 |
| 0.4 | 4,585 | 4,253 | 4,170 | 91.1 |
| 0.7 | 4,640 | 4,242 | 4,190 | 90.3 |
| 1.0 | 4,660 | 4,200 | 4,162 | 89.3 |

The antimony oxide and the phosphor can be dispersed in any of the conventional lacquers which are used in the lamp making industry. For example, cellulose esters, some of the polyvinyl resins such as polyacrylate or polymethacrylate may be used; either of these may be dispersed in suitable organic solvents such as ethyl alcohol or acetone. However many of the water soluble lacquers such as hydroxyethylcellulose or polyvinylmethylethermalaic anhydride copolymer have applicability. In addition, the most widely known lacquers are cellulose acetate or cellulose nitrate which may of course be used. Although we prefer to use antimony in the form of the trioxide, it may also be added in the form of the pentoxide with similar beneficial results. The composition of the coating suspension can be that which is conventionally used in the art; in particular, we can use 0.5 to 0.7 gram of thermally treated phosphor per milliliter of total suspension.

As specific examples of our invention we cite the following. We would like to point out however, that these examples are merely preferred embodiments of our invention and we do not intend them to be limitative upon the claim.

*Example I*

The manganese-activated zinc orthosilicate phosphor, as it is normally manufactured, is placed in a 7″ silica crucible. This crucible and contents are placed in a cold furnace and the furnace is programmed as follows:

The furnace temperature is set to rise linearly at the rate of 13° per minute to the temperature of 1950° C. This takes about 150 minutes. The temperature is then held at 1950° C. for the period of 90 minutes at which time the temperature is allowed to decrease over the period of 30 minutes to 1900° C. The phosphor is then heated from 1900° F. to 2100° F. at a rate of about 5° per minute for the space of 30 minutes and held there for the period of 30 minutes. Afterwards, the temperature is allowed to drop rapidly to 1950° F. which is maintained for the period of 45 minutes. At the end of the 45 minutes, the phosphor is heated to 2000° F. and maintained for 45 minutes. The total time of thermal treatment has been 505 minutes. The phosphor is allowed to cool in the furnace at the rate of about 100° per hour. At the end of about 12 hours, the temperature should be about 800 to 1000° F. At the end of the cooling period, the crucible and contents are removed from the furnace and allowed to cool to room temperature normally. Following the thermal treatment, the phosphor is sifted through a 325 mesh screen to obtain a uniform product.

A lacquer is then prepared by mixing nitro cellulose together with butylacetate or other suitable solvent to form a lacquer of conventional quantities of the thermally treated phosphor together with $Sb_2O_3$ in amounts of 0.4% by weight of the phosphor. The mixture is then ball milled, coated onto lamps and then the lamps are fabricated according to conventional techniques.

*Example II*

The manganese-activated zinc orthosilicate phosphor is placed in a 7″ silica crucible and placed cold into a hot furnace at 1950° F. for 2 hours. At the end of this time, the cooling process may be varied by quenching the phosphor rapidly.

Such quenching involves removing the crucible while hot from the furnace and dumping the phosphor onto a stainless steel plate and spreading it out to bring the material to room temperature as fast as possible. Following the heat treatment process, the phosphor is sifted in a 325 mesh screen to remove the course particles and obtain a uniform product. The preparation of the lacquer suspension follows the method set forth in Example I.

It is apparent that modifications may be made within the spirit and scope of the instant invention, but it is our intention however only to be limited by the spirit and scope of the following claim.

As our invention we claim:

In the process for fabricating a fluorescent lamp the steps which comprise: heating a zinc silicate fluorescent phosphor activated by manganese to a temperature between about 1850 to 2400° F. and then cooling to form a thermally treated phosphor; forming coating suspension by mixing said thermally treated phosphor, a lacquer vehicle and 0.2 to 0.7 percent by weight of the thermally treated phosphor of antimony oxides; and coating said suspension on a fluorescent lamp envelope.

References Cited

UNITED STATES PATENTS

| | | | |
|---|---|---|---|
| 2,607,014 | 8/1952 | Roy et al. | 117—33.5 |
| 2,656,320 | 10/1953 | Nagy et al. | 252—301.6 |
| 2,844,540 | 7/1958 | Rulon et al. | 252—301.6 |
| 2,965,579 | 12/1960 | Cox et al. | 252—301.6 |

WILLIAM D. MARTIN, *Primary Examiner.*

S. W. ROTHSTEIN, P. F. ATTAGUILE,
*Assistant Examiners.*